(12) United States Patent
Lenzing et al.

(10) Patent No.: US 6,722,196 B2
(45) Date of Patent: Apr. 20, 2004

(54) DEVICE FOR MEASURING AT LEAST ONE PARAMETER OF A FLOWING MEDIUM

(75) Inventors: Thomas Lenzing, Benningen (DE); Wolfgang Mueller, Rutesheim (DE); Dieter Tank, Kornwestheim (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 10/018,168
(22) PCT Filed: Feb. 23, 2001
(86) PCT No.: PCT/DE01/00690
§ 371 (c)(1), (2), (4) Date: May 15, 2002
(87) PCT Pub. No.: WO01/63218
PCT Pub. Date: Aug. 30, 2001

(65) Prior Publication Data
US 2002/0148303 A1 Oct. 17, 2002

(30) Foreign Application Priority Data
Feb. 26, 2000 (DE) .......................... 100 09 154

(51) Int. Cl.$^7$ .............................. G01F 1/68
(52) U.S. Cl. .............................. 73/204.21
(58) Field of Search ............ 73/204.22, 202.5, 73/118.2, 204.21, 204.26

(56) References Cited

U.S. PATENT DOCUMENTS

| 5,452,610 A | 9/1995 | Kleinhans |
| 5,892,146 A | 4/1999 | Kobayashi et al. |
| 5,918,279 A * | 6/1999 | Hecht et al. .......... 73/204.21 |
| 6,272,920 B1 * | 8/2001 | Tank et al. .......... 73/204.22 |

FOREIGN PATENT DOCUMENTS

| DE | 34 35 794 | 4/1985 | |
| DE | 43 38 891 | 9/1994 | |
| DE | 44 07 209 | 9/1995 | |
| DE | 197 38 337 | 3/1998 | |
| DE | 196 47 081 | 5/1998 | |
| DE | 196 52 753 | 6/1998 | |
| DE | 42 28 484 | 10/1998 | |
| DE | 197 35 373 | 11/1998 | |
| DE | 19735373 C1 * | 11/1998 | ........ G01F/1/684 |
| DE | 195 18 658 | 10/1999 | |
| JP | 05 026762 | 2/1993 | |

* cited by examiner

Primary Examiner—Edward Lefkowitz
Assistant Examiner—Jewel V. Thompson
(74) Attorney, Agent, or Firm—Kenyon & Kenyon

(57) ABSTRACT

A device for measuring at least one parameter, in particular of a volumetric flow, of a medium flowing in a line, in particular of the intake air volumetric flow of an internal combustion engine, includes at least one measuring element around which the medium flows. Constrictions, which do not uniformly constrict the cross-section of the line, do not produce any ring-shaped eddies that may be heard in the form of whistling noises.

19 Claims, 5 Drawing Sheets

DEVICE FOR MEASURING AT LEAST ONE PARAMETER OF A FLOWING MEDIUM

FIELD OF THE INVENTION

The present invention relates to a device for measuring at least one parameter of a medium flowing in a line.

BACKGROUND INFORMATION

German Published Patent Application No. 196 52 153 describes a device having a measuring element for measuring a mass of a flowing medium, in which a flow straightener with a screen is provided upstream from the measuring element. The flow straightener with screen is installed in a rigid conduit inside the line, thereby constricting the line.

German Published Patent Application No. 197 38 337 and U.S. Pat. No. 5,892,146 respectively describe a hot-wire air-flow meter, having an orifice that forms a single unit with one wall of the line and is located upstream from the measuring element. This arrangement constricts the line and increases the flow velocity of a forward mass flow with pulsating flow downstream from, and within the diameter of, the orifice without destroying the flow.

Ring-shaped constrictions in devices, such as those described above may, under certain flow conditions, produce acoustic disturbances in the line that become noticeable in the form of whistling sounds.

These disturbances are triggered by ring-shaped eddies arising downstream behind one edge of the constriction and propagate in the direction of flow of the line.

German Published Patent Application No. 198 156 58 describes a device having a measuring element to measure a mass of a medium flowing in a line, with a flow pipe being located in the line and the measuring element being provided in the flow pipe. Any loud, disturbing whistling noises that occur are reduced by structural grooves in the end face of the flow pipe.

SUMMARY

The device according to the present invention has the advantage that acoustic disturbances are avoided. This result is achieved in that suppression elements are used to reduce the formation of ring-shaped eddies.

At least one prevention element may be integrated into a rigid conduit of a flow straightener or into a second rigid conduit to simplify manufacturing.

If there is no flow straightener or rigid conduit, integrating at least one prevention element into one wall of a line may simplify manufacturing.

According to one arrangement of the suppression elements, the latter may be evenly distributed in the circumferential direction of the line and have the same shape to avoid distorting the velocity profile of the flow.

At least one suppression element may be configured as an elevation in the line to simplify manufacturing.

One example embodiment of the suppression element provides an orifice with different sections, the radial spacing of which varies in relation to a center line of the line.

The prevention elements may be rounded against the main direction of flow to avoid distorting the velocity profile of the flow.

A tubular body may be provided in the line, thereby avoiding a deviation in the measurement characteristic of a measuring element, caused by the impact of fluid or solid particles.

A protective screen may be integrated into the line or into the tubular body.

DETAILED DESCRIPTION

Figure 1:
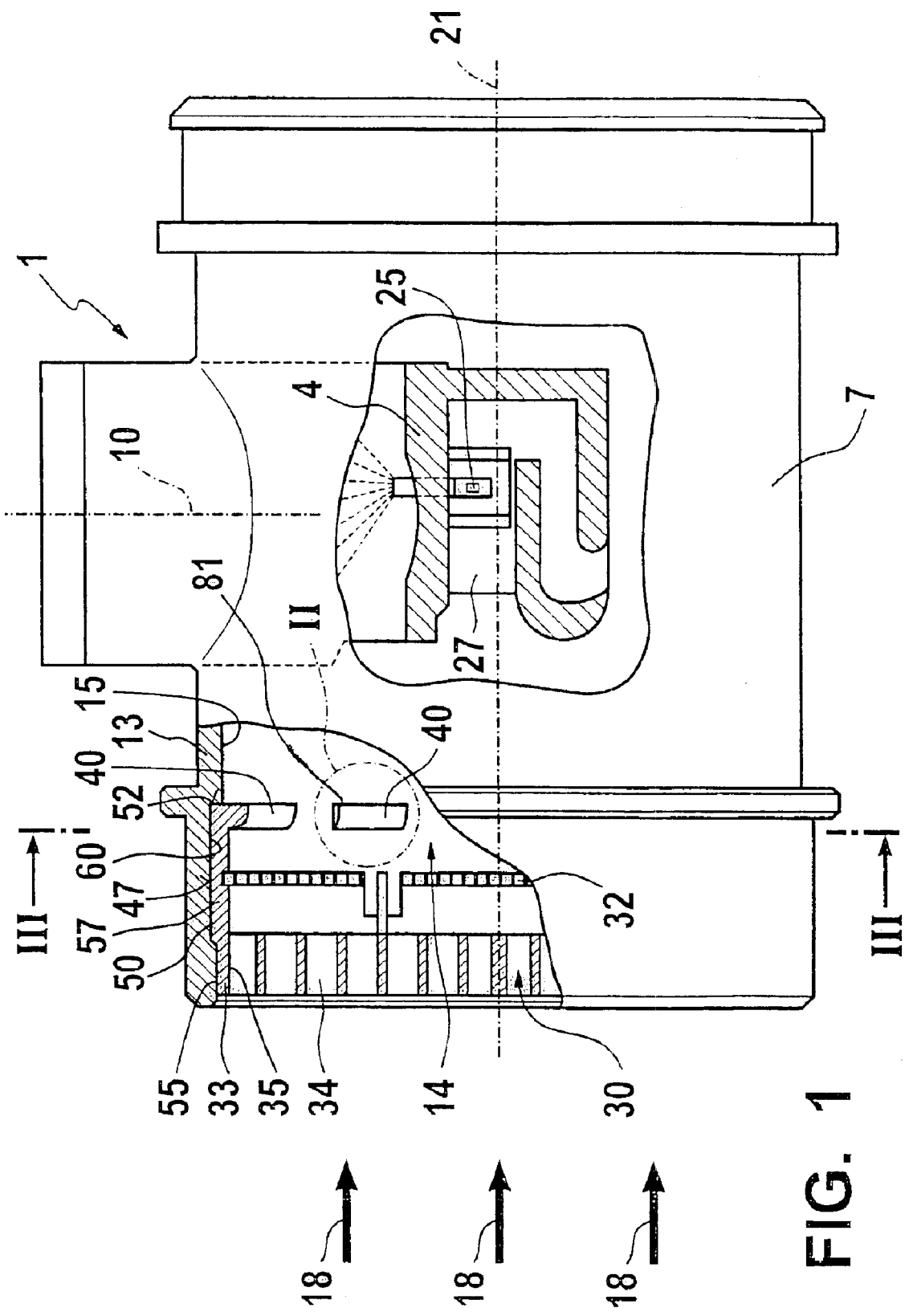
FIG. 1 is a schematic view of a device according to the present invention having a flow straightener and a screen, in which at least one prevention element according to the present invention is provided.

FIG. 1 is a partial cross-sectional view of a device 1 for measuring at least one parameter of a medium flowing in a line 14, in particular a parameter of the intake air mass of an internal combustion engine. Parameters of a flowing medium are, for example, volumetric flow for determining a mass, a temperature, a pressure or a flow velocity, which are detected using suitable sensors. Device 1 may also be used to measure additional parameters.

The flowing medium may be air, a gas mixture or a fluid. The internal combustion engine may be, for example, a mixture-compressing engine with externally-supplied ignition or even an air-compressing engine with spontaneous ignition.

Device 1 includes at least one measuring unit 4, which, for example, may be plugged into an instrument gland 7 of device 1, and in which is provided a measuring element 25. Measuring element 25 may be, for example, a temperature sensor (such as that described in German Published Patent Application No. 42 28 484), a pressure sensor (such as that described in German Published Patent Application No. 34 35 794), or an air-flow sensor, which detects the corresponding parameters. For example, a volumetric air-flow sensor is selected as one of the different possible sensors.

Measuring unit 4 includes, for example, a narrow, rod-like, cuboid shape that extends longitudinally in the direction of a plug-in axis 10 and may be introduced, for example, by plugging, into an opening provided in one wall 13 of instrument gland 7. Wall 13 includes an inner wall 15 and limits a flow cross-section of line 14, which includes, for example, a circular cross-section, in the center of which a center axis 21 extends parallel to wall 13 in direction 18 of the flowing medium and is oriented perpendicular to plug-in axis 10. In FIG. 1, the direction of the flowing medium is illustrated by arrows 18 and it moves from left to right.

Measuring element 25 is inserted into the flowing medium together with measuring unit 4. A measuring channel 27, in which measuring element 25 is provided for measuring the medium flowing in instrument gland 7, is incorporated into measuring unit 4 of device 1. The structure of a measuring unit 4 of this type, having a measuring element 25, is described, for example, in German Published Patent Application No. 44 07 209.

A screen 32 and a sleeve-like flow straightener 30, which is attached, for example, to a rigid conduit 33, are provided upstream from measuring element 25. Rigid conduit 33 includes an inner diameter that is smaller than line 14, thus forming a constriction 35.

Flow straightener 30 is made, for example, of plastic and is produced, for example, by injection molding and includes a multiplicity of, for example, rectangular openings 34 oriented in the direction of flow.

The structure of a flow straightener 30 of this type, having screen 32, is described, for example, in German Published Patent Application No. 196 52 753. At least one acoustic prevention element 40 is integrally attached, for example, to rigid conduit 33 of flow straightener 30.

For the purpose of final assembly of device 1, the assembly unit formed by flow straightener 30 and screen 32 is inserted into a, for example, circular opening 47 provided at the upstream end of instrument gland 7, until ring-shaped wall 50 of flow straightener 30 comes into contact with a stop 52 of instrument gland 7 that reduces the cross-section of opening 47.

To permanently hold flow straightener 30 in place in opening 47, flow straightener 30 includes barbed hook elements 57 on rigid conduit 33, which, for example, extend slightly outward radially from its external surface 55 and may correspondingly latch into place in a groove 60 provided in an inner wall of opening 47 in instrument gland 7.

Figure 2A:
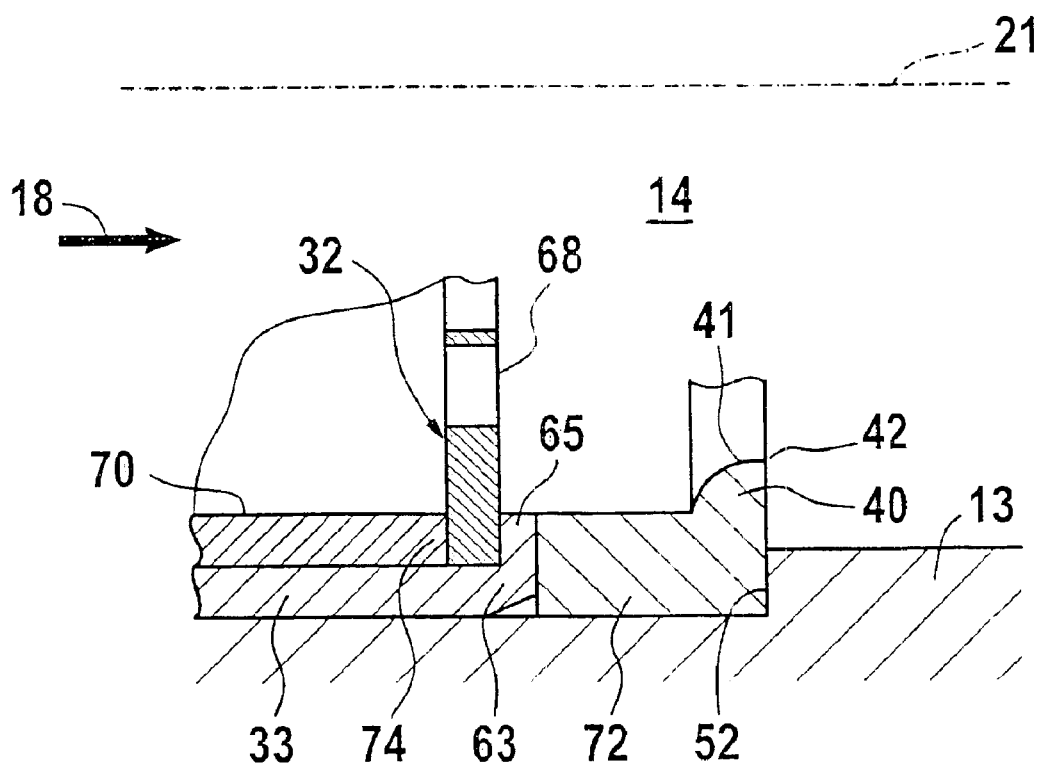
FIGS. 2a and 2b illustrate a section of the device illustrated in FIG. 1.

FIG. 2a illustrates an enlarged portion of FIG. 1, identified by a dotted line. Locking hooks 63 are elastic and have locking heads 65 that extend inwardly in a radial direction. When screen 32 is installed, locking heads 65 grip around an edge of screen 32 like pliers and rest against a surface 68 of screen 32 facing measuring unit 4, so that locking heads 65 press screen 32 against a circumferential shoulder 74 of flow straightener 30 formed by inner surface 70.

A second rigid conduit 72 is located downstream behind rigid conduit 33. Second rigid conduit 72 is provided at the same radial distance from center line 21 as inner surface 70. At the downstream end of second rigid conduit 72 is provided at least one acoustic prevention element 40, which, for example, forms a single unit and extends into line 14 in a radial direction. Second rigid conduit 72 is pressed against shoulder 52, for example, by rigid conduit 33. However, it may also be fastened in line 14, like rigid conduit 33. Acoustic suppression element 40 acts mechanically on the flow in line 14, thus preventing ring-shaped eddies that form downstream behind an edge of a constriction and propagate in the direction of flow of the line, becoming noticeable in the form of whistling noises.

In a cross-sectional view along main direction of flow 18 through prevention element 40, prevention element 40 includes, for example, a rounded shape 41 in the upstream direction and a rough edge 42 in the downstream direction. The at least one 5 suppression element 40 constricts line 14 by 2% to 30%.

Figure 2B:
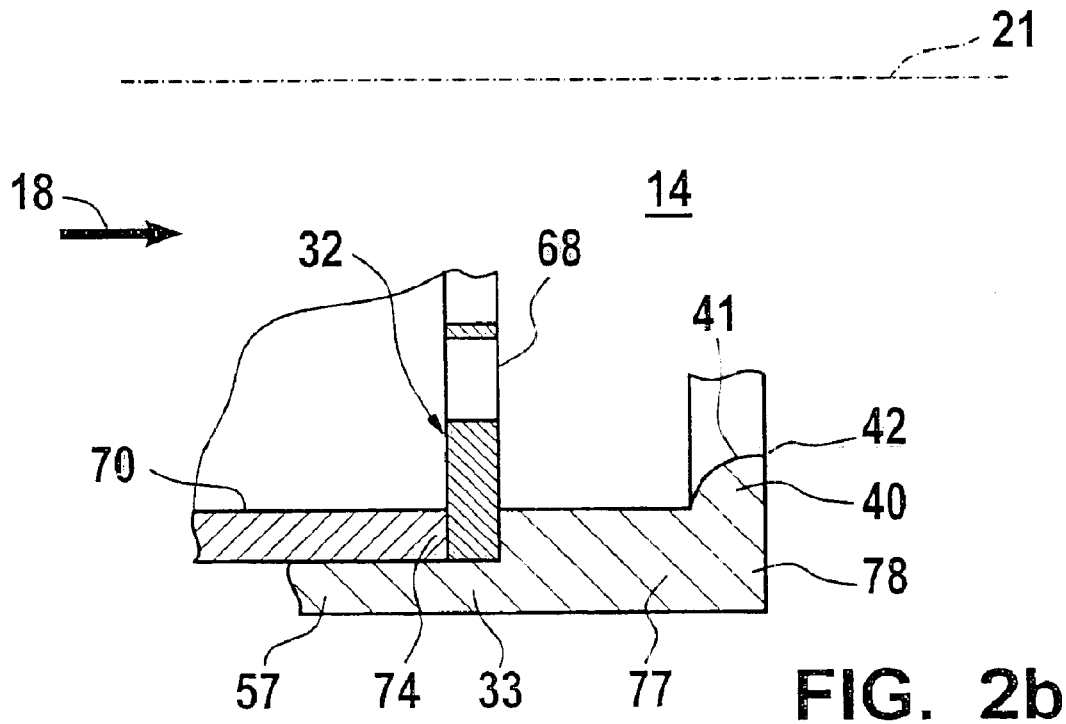

FIG. 2b illustrates the arrangement of second rigid conduit 72 and rigid conduit 33 as a single unit. Viewed in the downstream direction, rigid conduit 33 includes an extension arm 77 that continues behind screen 32 along inner wall 15. Acoustic prevention element 40, which extends into line 14 in a radial direction, is located at end 78 of extension arm 77. Screen 32 is installed, for example, by bending rigid conduit 33 outwardly radially in the region of extension arm 77 and then inserting screen 32.

FIGS. 3a to 3d illustrate several example embodiments of prevention element 40. The same reference numbers used in the previous figures identify the same or functionally equivalent components.

Figure 3A:
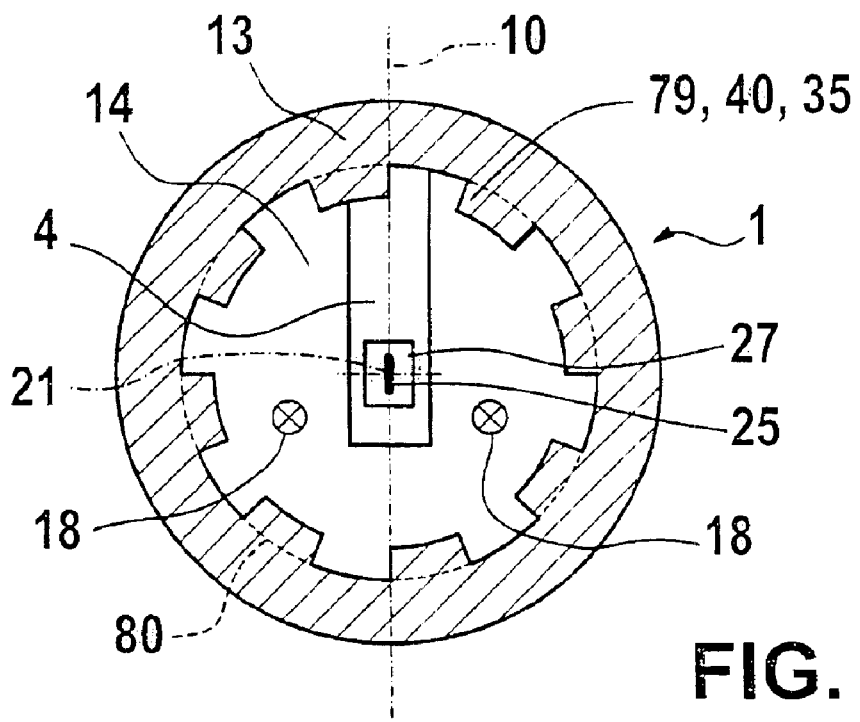
FIGS. 3a to 3d illustrate several example embodiments of suppression elements.

FIG. 3a illustrates a prevention element 40 that is configured as a radial elevation 79 relative to center line 21 and includes a rectangular cross-section at right angles to main direction of flow 18. Elevations 79, for example, are of the same size and are evenly distributed along a circumferential line 80 of line 14, which is indicated by the dotted line.

Figure 3B:
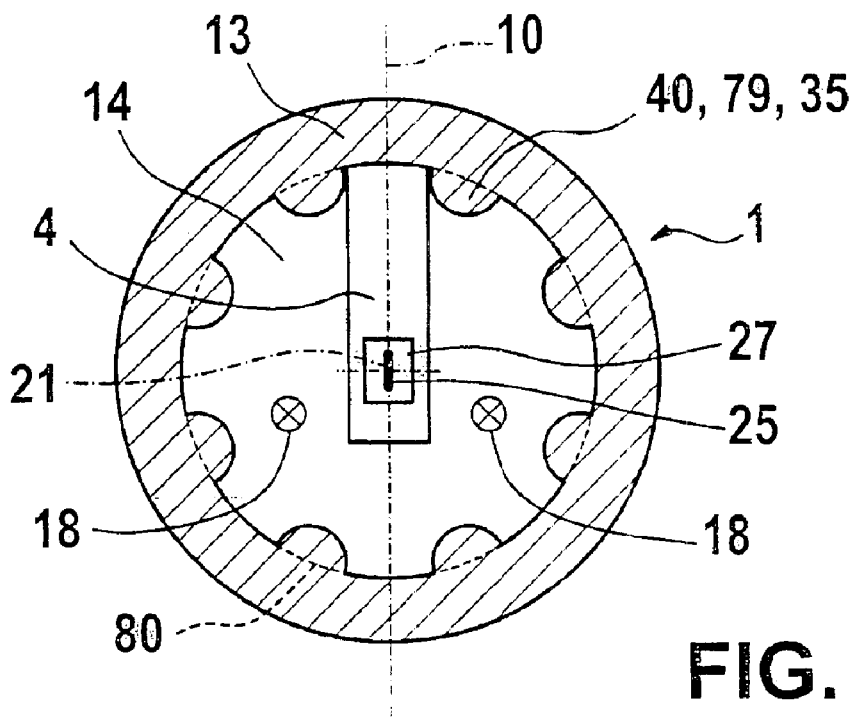
Figure 3C:
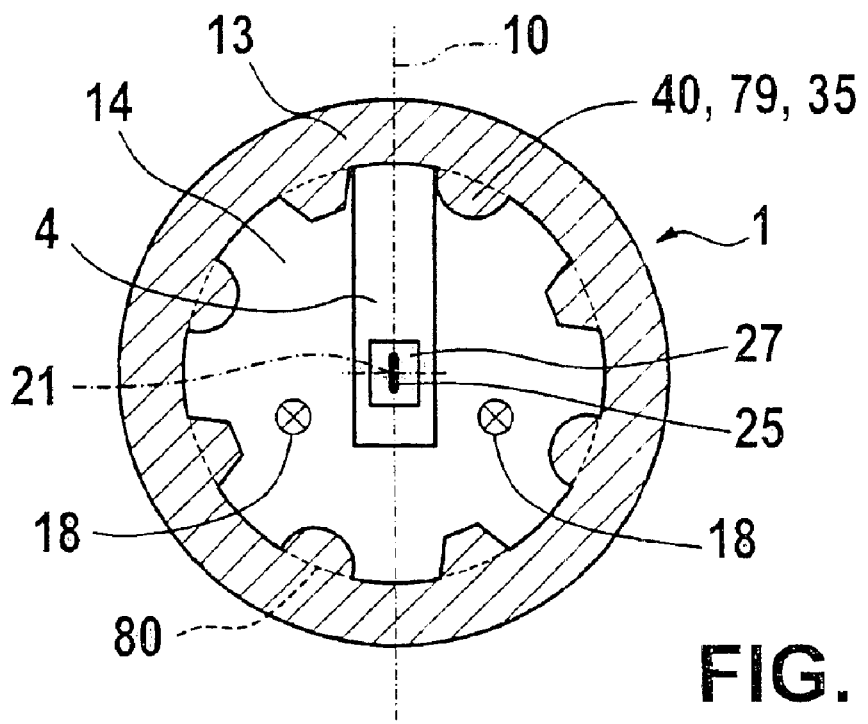

Radial elevations 79 illustrated in FIG. 3b have a semicircular cross-section at right angles to main direction of flow 18. FIG. 3c illustrates that radial elevations 79 may have different geometries in one embodiment of the device.

In the radial cross-section, they are, for example, trapezoidal or semicircular. Elevations 70 are distributed evenly and arranged symmetrically.

Figure 3D:
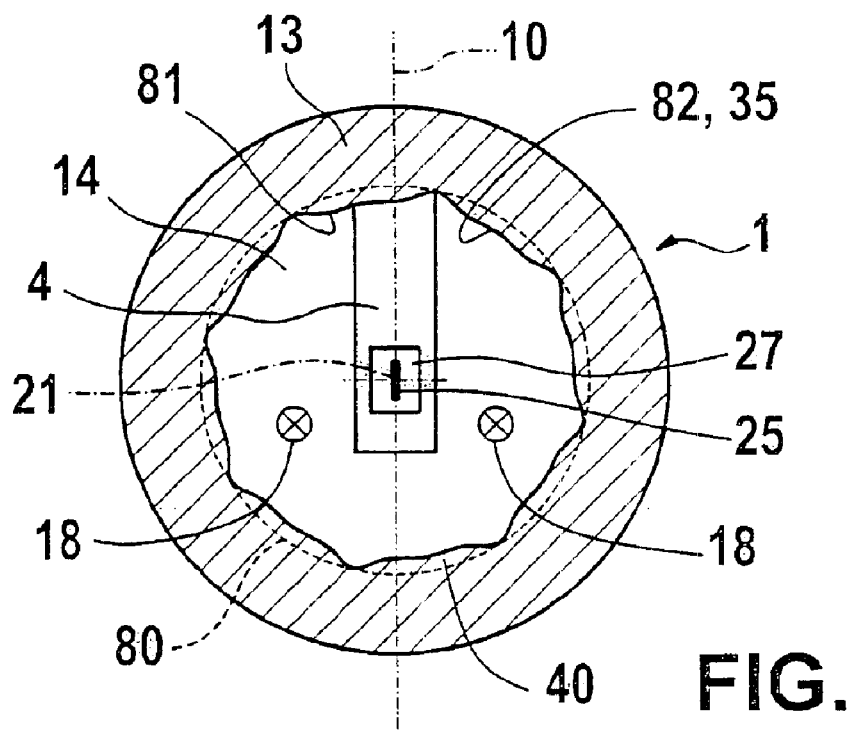

FIG. 3d illustrates a prevention element 40 configured as an orifice 82, the radial limiting line 81 of which does not have a constant inner diameter and is configured, for example, in the shape of a wave.

Prevention elements 40 in this case form, for example, a single unit with instrument gland 7.

Figure 4:
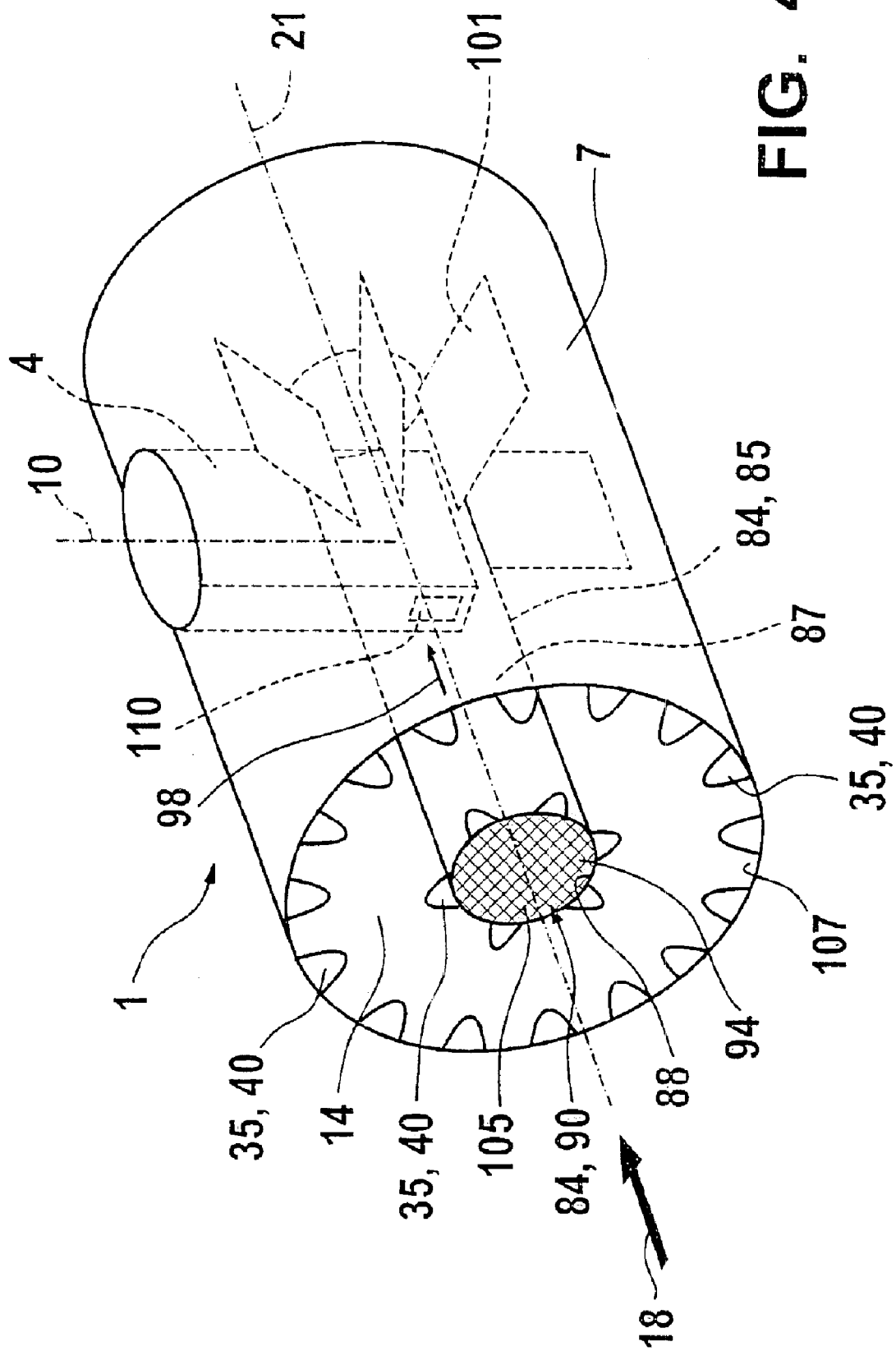
FIG. 4 is a perspective view of a device according to the present invention with a tubular body.

FIG. 4 illustrates device 1 in a line 14 within which a medium flows. The same reference numbers used in the previous figures identify the same or functionally equivalent components. In line 14, and spaced at a radial distance from line 14, is provided, for example, a tubular body 85, around which the medium flows and which serves as an element 84 for reducing the impact of fluid or solid particles on measuring element 25.

Prevention elements 40 are arranged in main direction of flow 18 so that their rough edges 42 are located after or at the same level as a tubular inlet opening 88 in tubular body 85 when viewed in the axial direction.

Prevention elements 40 in this case are connected to instrument gland 7, for example, forming a single unit. However, they may also be provided as additional units or only on tubular body 85.

Prevention elements 40 may, for example, also be provided in tubular body 85.

The at least one prevention element 40, 79, 82 is connected, for example, to tubular body 85, for example, forming a single unit. Tubular body 85 includes a flow channel 87 and a protective screen 90, located in the region of its upstream end, as an element 84 for reducing the impact of fluid or solid particles on measuring element 25.

Protective screen 90 may be configured, for example, as a wire mesh or plate-type screen. Any other shape is also possible. Plastic, metal, ceramic or glass may be used as the material for protective screen 90, in the case of both the wire mesh and plate-type protective screen 90. Plate-type protective screen 90 made of plastic may be produced, for example, entirely by injection molding or by creating screen openings 94 in a plate-type basic body using a material-removal method. Plate-type protective screen 90 made of metal may be produced, for example, from a sheet by punching, eroding, drilling, etc.

A direction of flow 98 exists at a slight distance from protective screen 90 in the downstream region of flow channel 87. Direction of flow 98 extends roughly parallel to main direction of flow 18. Line 14 has a center line 21, which, for example, is also the center line of tubular body 85. Measuring unit 4, for example, extends into tubular body 85. A connector end of measuring unit 4 that contains the electrical connections, for example in the form of connector prongs, remains, for example, outside line 14. Measuring element 25, which is in contact with the air flowing through flow channel 87 and is used for detecting air mass entering the internal combustion engine, is provided in a conventional manner in measuring unit 4. Measuring element 25 may be configured in a conventional manner, for example, in the form of at least one temperature-dependent resistor. In particular, it is possible to configure measuring element 25 as a micromechanical component that has a dielectric diaphragm on which resistor elements are provided, as described, for example, in German Published Patent Application No. 43 38 891 and U.S. Pat. No. 5,452,610, respectively. It is also conceivable to incorporate measuring element 25 into line 14 or tubular body 85 without a measuring unit.

At least two braces 101, which hold tubular body 85 in place in line 14, are provided, for example, on tubular body 85. In addition to holding tubular body 85 in place, braces 101 also increase the pressure drop in the air flow between line 14 and tubular body 85, thus increasing the amount of air flowing through flow channel 87, and braces 101 also straighten the intake air flow in the desired manner.

Tubular body 85 may also be provided in line 14 without braces 101, for example, it may be fastened to measuring unit 4.

Protective screen 90 includes, for example, bars 105 that are positioned perpendicular to each other, for example perpendicular to plug-in axis 10 and horizontal to plug-in axis 10, with bars 105 positioned horizontally relative to center line 21, for example, being arranged at an angle of approximately 30 degrees relative to plug-in axis 10. This varies main direction of flow 18 downstream behind protective screen 90. Protective screen 90 may also be oriented at an angle in relation to main direction of flow 18. Dirt particles and fluid droplets are deposited on protective screen 90 and are directed to an inner wall 107 of line 14 or of tubular body 85, thus moving past inlet opening 110 of measuring unit 4 or past measuring element 25.

What is claimed is:

1. A device for measuring at least one parameter of a medium flowing in a main direction of flow in a line, comprising:
   a measuring element circumflowed by the medium and positioned in the line; and
   at least one constriction configured to produce acoustic disturbances in the medium and positioned along a circumferential line of the line upstream of the measuring element;
   wherein the at least one constriction is circumflowed by the medium and includes a mechanical-acoustic prevention element, the prevention element including at least two radial elevations circumflowed by the medium and the at least two radial elevations being arranged along the circumferential line, so as to at least reduce the acoustic disturbances.

2. The device according to claim 1, wherein the at least one parameter includes a mass flow.

3. The device according to claim 2, wherein the mass flow includes an intake air mass flow of an internal combustion engine.

4. The device according to claim 1, further comprising at least one element positioned in the line and configured to reduce an impact of one of fluid and solid particles on the measuring element.

5. The device according to claim 4, wherein the element configured to reduce the impact of one of fluid and solid particles includes a tubular body having a flow channel through which the medium flows, the measuring element being located in the tubular body.

6. The device according to claim 4, wherein the element configured to reduce the impact of one of fluid and solid particles includes a protective screen located in one of the line and the tubular body.

7. The device according to claim 1, wherein the radial elevation includes a rectangular cross-section arranged at a right angle to the main direction of flow.

8. The device according to claim 1, wherein the radial elevation includes a trapezoidal cross-section arranged at a right angle to the main direction of flow.

9. The device according to claim 1, wherein the radial elevation includes one of an oval and a circular cross-section arranged at a right angle to the main direction of flow.

10. The device according to claim 1, wherein radial elevations are evenly spaced in relation to one another along a radial circumferential line of the line.

11. The device according to claim 1, wherein radial elevations have a same shape.

12. The device according claim 1, wherein the line includes a center line, the acoustic prevention element including an aperture provided in the line and having a radial limiting line, a radial distance between the radial limiting line and the center line varying in a radial circumferential direction.

13. The device according to claim 12, wherein the radial limiting line of the aperture is wave-shaped.

14. The device according to claim 1, wherein the at least one prevention element is rounded against the main direction of flow.

15. The device according to claim 1, further comprising a flow straightener provided in the line and integrated into a rigid conduit that is insertable into the line, the at least one prevention element provided as a single unit on the rigid conduit.

16. The device according to claim 1, wherein the at least one prevention element is provided as a single unit on a rigid conduit that is insertable into the line.

17. The device according to claim 1, wherein the at least one prevention element is configured as a single unit with a wall of the line.

18. The device according to claim 1, wherein the constriction is configured to at least reduce the ring-shaped eddies.

19. The device according to claim 18, wherein the constriction at least reduces the acoustic disturbance associated with the ring-shaped eddies.

* * * * *